United States Patent
Honda et al.

(10) Patent No.: US 9,383,736 B2
(45) Date of Patent: Jul. 5, 2016

(54) AIR-CONDITIONING CONTROLLING DEVICE AND METHOD

(71) Applicant: Azbil Corporation, Tokyo (JP)

(72) Inventors: Mitsuhiro Honda, Tokyo (JP); Yukako Saisu, Tokyo (JP)

(73) Assignee: Azbil Corporation, Tokyo (JP)

( * ) Notice: Subject to any disclaimer, the term of this patent is extended or adjusted under 35 U.S.C. 154(b) by 344 days.

(21) Appl. No.: 13/957,144

(22) Filed: Aug. 1, 2013

(65) Prior Publication Data

US 2014/0039689 A1 Feb. 6, 2014

(30) Foreign Application Priority Data

Aug. 1, 2012 (JP) ................................. 2012-170970

(51) Int. Cl.
G05B 21/00 (2006.01)
G05B 15/02 (2006.01)
F24F 11/00 (2006.01)

(52) U.S. Cl.
CPC .............. *G05B 15/02* (2013.01); *F24F 11/006* (2013.01); *F24F 2011/0063* (2013.01); *F24F 2011/0064* (2013.01)

(58) Field of Classification Search
CPC .............. G05B 15/02; G05B 23/0294; G05B 23/0281; G06N 3/08; G06N 3/086; G06N 99/005; G06F 2217/80; G06F 1/206; F24F 2011/0063; F24F 11/006; F24F 11/0086; F24F 2011/0047; F24F 2011/0064
See application file for complete search history.

(56) References Cited

U.S. PATENT DOCUMENTS

| | | | | |
|---|---|---|---|---|
| 9,146,547 B2 * | 9/2015 | Sharma | ................ | G05B 17/02 |
| 2003/0083756 A1 * | 5/2003 | Hsiung | ................ | G05B 15/02 |
| | | | | 700/28 |
| 2006/0259163 A1 * | 11/2006 | Hsiung | ................ | G05B 15/02 |
| | | | | 700/30 |

(Continued)

FOREIGN PATENT DOCUMENTS

| JP | 2003-207189 | 7/2003 |
|---|---|---|
| JP | 2011-089677 A | 5/2011 |

OTHER PUBLICATIONS

Alcala et al., Multicriteria Genetic Tuning for the Optimization and Control of HVAC Systems, Applied Decision Support with Soft Computing, Springer-Verlag, 2003.*

(Continued)

*Primary Examiner* — Darrin Dunn
(74) *Attorney, Agent, or Firm* — Troutman Sanders LLP (57) ABSTRACT

An air-conditioning controlling device includes an indicator calculating portion that calculates one or more indicators for evaluating, for each individual Pareto solution, similarity of the detail of air-conditioning control based on the operating volumes and/or the state distributions for the Pareto solution, a similarity calculating portion that calculates, for each Pareto solution, similarity of the Pareto solution to a reference Pareto solution, based on the indicators for the Pareto solution and the indicators for the reference Pareto solution, which is selected as a reference from the Pareto solutions, and an air-conditioning instructing portion that sends, to the air-conditioning system, the operating volumes of the Pareto solution with the least similarity to the reference Pareto solution from among the Pareto solutions belonging to the new air-conditioning controlling mode when there is a change, to a new air-conditioning controlling mode, of the air-conditioning controlling mode that is applied to the air-conditioned space.

5 Claims, 5 Drawing Sheets

(56) References Cited

U.S. PATENT DOCUMENTS

| | | | | |
|---|---|---|---|---|
| 2010/0332373 | A1* | 12/2010 | Crabtree | G06Q 50/06 705/37 |
| 2012/0165993 | A1* | 6/2012 | Whitehouse | G05D 23/1904 700/278 |
| 2012/0209435 | A1 | 8/2012 | Harayama | |
| 2012/0271935 | A1* | 10/2012 | Moon | G06F 9/5094 709/224 |
| 2013/0024014 | A1* | 1/2013 | Sharma | G05B 13/04 700/29 |

OTHER PUBLICATIONS

Palonen et al., A Genetic Algorithm for Optimization of Building Envelope and HVAC System Parameters, HVAC Tech, Helsinki University of Technology, Eleventh Int. IBPSA Conf, 2009.*

Nassif et al., Optimization of HVAC Control System Strategy Using Two-Objective Genetic Algorithm, HVAC&R Research, vol. 11, No. 3, Jul. 2005.*

Korean Office Action dated Nov. 13, 2014, which issued during prosecution of Korean Application No. 10-2013-0090642, which corresponds to the present application.

Kato, Shinsuke; Kobayashi, Hikaru; and, Murakami, Shuzo: "Scales for Assessing Contribution of Heat Sources and Sinks to Temperature Distributions in Room by Means of Numerical Simulation," Institute of Industrial Science, University of Tokyo, Air-Conditioning and Sanitation Engineering Reports No. 69, pp. 39 to 47, Apr. 1998. (w/English summary).

Nassif et al., "Evolutionary Algorithm for Multi-Objective Optimization in HVAC System Control Strategy" Conference: Fuzzy Information, 2004. Processing NAFIPS '04. IEEE Annual Meeting of the, vol. 1 pp. 51-56.

Yoo et al., "Pareto Efficient Multi-Objective Test Case Selection" Proceeding ISSTA '07 Proceedings of the 2007 international symposium on Software testing and analysis pp. 140-150.

* cited by examiner

Background

AIR-CONDITIONING CONTROLLING DEVICE AND METHOD

CROSS REFERENCE TO RELATED APPLICATION

This application claims priority under 35 U.S.C. §119 to Japanese Patent Application No. 2012-170970, filed on Aug. 1, 2012, the entire content of which being hereby incorporated herein by reference.

FIELD OF TECHNOLOGY

The present invention relates to an air-conditioning controlling technology, and, in particular, relates to an air-conditioning controlling technology for calculating operating volumes for an air-conditioner, using a distributed system heat flow analysis method.

BACKGROUND

In order to control and maintain an air-conditioned space at a specific air-conditioning environment a technology that uses a distributed system flow analysis technique for estimating thermal distributions and an airflow distributions within a space has been proposed as a technique for determining operating volumes such as flow rates, flow directions, temperatures, and the like of conditioned air that is supplied from air-conditioning equipment. See, for example, Japanese Unexamined Patent Application Publication 2011-089677.

In this air-conditioning controlling technology, first forward analysis of the state of air-conditioning in the air-conditioned space is performed using a distributed system flow analysis techniques, the distribution data indicating the distribution of temperatures and air flows within the air-conditioned space are calculated, and then, based on setting data wherein target temperatures are applied to specific locations within the air-conditioned space in the distribution data that is obtained, reverse analysis is performed on the temperature and airflow distributions within the air-conditioned space using distributed system flow analysis technique to back-calculate new operating volumes indicating new blowing speeds and blowing temperatures for the air-conditioned space from the blowing vents, required to cause a specific location to go to a target temperature.

The use of the forward analysis in the conventional distributed system flow analysis technique, described above, makes it possible to estimate the air-conditioning environment that would be produced through air-conditioning control of the air-conditioned space using operating volumes for the various hypothetical operating volumes. Consequently, it is possible to estimate, in advance, as solutions for achieving various air-conditioning environments, combinations of the air-conditioning environments and the operating volumes obtained, enabling the selection of any given solution from these solutions, to control an air-conditioning system based on the operating volumes included in the solution, to achieve any given air-conditioning environment easily.

On the other hand, when actually performing air-conditioning control, there are multiple objectives for the air-conditioning control, such as the operating policies of the administrators who control the air-conditioned space, and the desires of the users who use the air-conditioned space. With such objectives, there are objectives that have mutual trade-off relationships. For example, while typically the objectives for air-conditioning control include energy conservation and comfort, these have a trade-off relationship.

Because of this, if a solution for use in air-conditioning control is selected from solutions that have been estimated in advance, it is important to extract the Pareto solutions (the optimal solutions) as solutions that consider the trade-offs between such objectives. A Pareto solution is a solution wherein, in order to improve the value of one objective function it is necessary to adversely affect the value of one or more other objective functions, that is, it is a compromise solution. Specifically, a Pareto solution is a solution that provides a better evaluation than other solutions under specific conditions.

Figure 5:
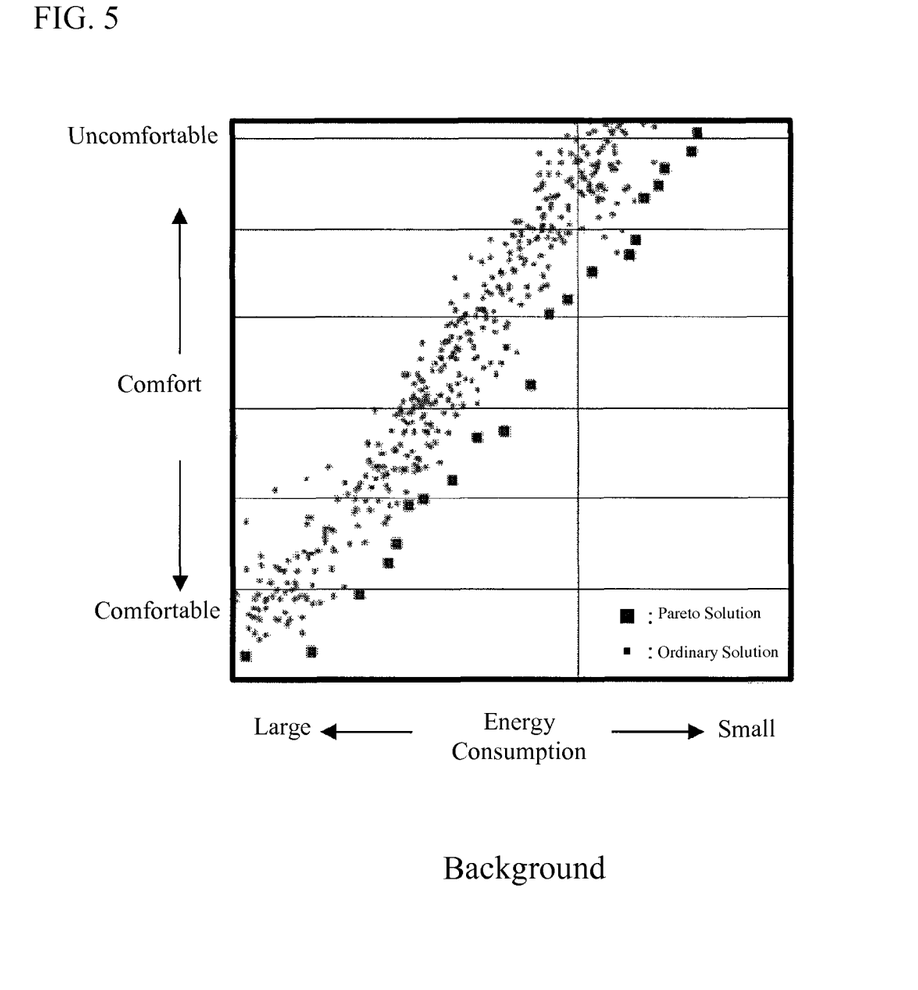
FIG. 5 is an explanatory diagram illustrating Pareto solutions.

FIG. 5 is an explanatory diagram illustrating Pareto solutions. Here two objectives for air-conditioning control having a trade-off relationship, specifically energy conservation and comfort, are selected, and based on the respective evaluation values wherein the objective functions for evaluating these objectives are calculated and symbols for various solutions, including the Pareto solution, are plotted at coordinate locations corresponding to the evaluation values, on a display screen. As illustrated in FIG. 5, a Pareto solution is a solution wherein, if an achievement level for one, namely energy conservation (or comfort) is selected, air-conditioning control is achieved that maximizes the achievement level of the other, namely comfort (or energy conservation) while satisfying the achievement level for energy conservation (or comfort). Consequently, a Pareto solution can be understood to be a solution that takes into consideration the balance between these objectives.

If one of the Pareto solutions is selected in this way from among the plurality of Pareto solutions that indicate the operating volumes for controlling the air-conditioning environment and the operating volumes for that Pareto solution are provided to the air-conditioning system, then it will be possible to perform air-conditioning control taking into account balance among a plurality of objectives regarding air-conditioning control, such as the operating policies by the administrators and the desires of the users, and the like.

However, normally for a given air-conditioning environment there is a plurality of operating volumes for controlling and maintaining the air-conditioned space in the desired air-conditioning environment. For example, if the temperature of a specific location within the air-conditioned space is to be reduced to a target temperature, there may be a method wherein the blowing speed of the air-conditioned air that is blown in from a blowing vent that exists near that location is increased, along with a method wherein the blowing temperature of the air-conditioned air that is blown in from that blowing vent is reduced instead.

Consequently, even for Pareto solutions that are close for the achievement levels for energy conservation and comfort, there will be cases wherein there are large differences between the operating volumes indicated by the respective Pareto solutions.

Moreover, if there are large differences in the operating volumes, then transitioning from the original operating volumes to the new operating volumes may require some time. For example, for the blowing temperature it is necessary to adjust the heat exchange in the air-conditioning equipment, producing a time delay depending on the time constant of the heat exchange. Moreover, even after controlling to the new blowing speed and blowing temperature, still there will be the time delay until changing to the new air-conditioning environment due to the time constants of the air distribution and heat distribution in the air-conditioned space. Because of this, when there are large differences in operating volumes it is not possible to transition the air-conditioning environment smoothly and efficiently. Moreover, such large differences in the operating volumes are also factors that contribute apprehension by the users of the air-conditioned space.

The present invention is to solve such problems, and an aspect thereof is to provide an air-conditioning controlling technology wherein it is possible to transition an air-conditioning environment, without producing apprehension, smoothly in accordance with objectives for the air-conditioning control, based on individual Pareto solutions for achieving a given air-conditioning environment.

SUMMARY

In order to achieve the aspect set forth above, the present invention provides an air-conditioning controlling device for controlling, to an arbitrary air-conditioning environment, an air-conditioned space through sending, to an air-conditioning system that controls air-conditioning equipment, operating volumes for the air-conditioning equipment. The air-conditioning controlling device includes a distributed system flow analyzing portion that estimates, through performing distributed system flow analysis for a plurality of different operating volumes, respective state distributions that describe the air-conditioning environment of produced by the operating volumes, a Pareto solution identifying portion that identifies, from solution candidates including combinations of operating volumes and state distributions, respective Pareto solutions in relation to the objective functions through, for each solution candidate, evaluating the solution candidate based on a plurality of objective functions that have been set in advance, a Pareto solution categorizing portion that respectively categorizes the individual Pareto solutions into a plurality of air-conditioning controlling modes, set in advance, based on the evaluation values of the individual Pareto solutions, calculated by the objective functions, an indicator calculating portion that calculates one or more indicators for evaluating, for each individual Pareto solution, similarity of the detail of air-conditioning control based on the operating volumes and/or the state distributions for the Pareto solution, a similarity calculating portion that calculates, for each Pareto solution, similarity of the Pareto solution to a reference Pareto solution, based on the indicators for the Pareto solution and the indicators for the reference Pareto solution, which is selected as a reference from the Pareto solutions, and an air-conditioning instructing portion that sends, to the air-conditioning system, the operating volumes of the Pareto solution with the least similarity to the reference Pareto solution from among the Pareto solutions belonging to the new air-conditioning controlling mode when there is a change, to a new air-conditioning controlling mode, of the air-conditioning controlling mode that is applied to the air-conditioned space.

In one structural example of the air-conditioning controlling device set forth above, the indicator calculating portion, when calculating the indicators for the Pareto solution, selects, as an indicator, one or more values from among the supply air temperature of the air-conditioned air that is supplied to the air-conditioned space, the total airflow of the air-conditioned air, and/or the blowing airflows of the blowing vents of the air-conditioned space, included in the operating volumes for the Pareto solution.

In one structural example of the air-conditioning controlling device set forth above, when calculating the similarity of a Pareto solution, the similarity calculating portion calculates, for each type of indicator, the difference between the candidate indicator and the reference indicator, and calculates, as the similarity, an average value for the absolute values of the differences, a maximum value for the absolute values of the differences, or a root mean square of the differences.

Moreover, the present invention provides an air-conditioning controlling method using an air-conditioning controlling device for controlling, to an arbitrary air-conditioning environment, an air-conditioned space through sending, to an air-conditioning system that controls air-conditioning equipment, operating volumes for the air-conditioning equipment. The air-conditioning controlling method includes a distributed system flow analyzing step wherein a distributed system flow analyzing portion estimates, through performing distributed system flow analysis for a plurality of different operating volumes, respective state distributions that describe the air-conditioning environment of produced by the operating volumes, a Pareto solution identifying step wherein a Pareto solution identifying portion identifies, from solution candidates comprising combinations of operating volumes and state distributions, respective Pareto solutions in relation to the objective functions through, for each solution candidate, evaluating the solution candidate based on a plurality of objective functions that have been set in advance, a Pareto solution categorizing step wherein a Pareto solution categorizing portion respectively categorizes the individual Pareto solutions into a plurality of air-conditioning controlling modes, set in advance, based on the evaluation values of the individual Pareto solutions, calculated by the objective functions, an indicator calculating step wherein an indicator calculating portion calculates one or more indicators for evaluating, for each individual Pareto solution, similarity of the detail of air-conditioning control based on the operating volumes and/or the state distributions for the Pareto solution, a similarity calculating step wherein a similarity calculating portion calculates, for each Pareto solution, similarity of the Pareto solution to a reference Pareto solution, based on the indicators for the Pareto solution and the indicators for the reference Pareto solution, which is selected as a reference from the Pareto solutions, and an air-conditioning instructing step wherein an air-conditioning instructing portion sends, to the air-conditioning system, the operating volumes of the Pareto solution with the least similarity to the reference Pareto solution from among the Pareto solutions belonging to the new air-conditioning controlling mode when there is a change, to a new air-conditioning controlling mode, of the air-conditioning controlling mode that is applied to the air-conditioned space.

In the present invention, the Pareto solution that is most similar to the details of the air-conditioning control by an existing reference Pareto solution is selected from Pareto solutions that are near to new achievement levels for the objectives is selected as the new Pareto solution when we selecting a Pareto solution. Consequently, controlling the air-conditioning environment based on such a new Pareto solution not only makes it possible to achieve air-conditioning control in accordance with the objectives of the administrator and users of the air-conditioned space when it comes to the air-conditioning control, but also possible transition the air-conditioning environment efficiently and smoothly without causing the user of the air-conditioned space discomfort or apprehension.

DETAILED DESCRIPTION

Using forward analysis in a distributed system flow analysis technique to estimate air-conditioning environments produced by controlling an air-conditioned space using a variety of hypothetical operating volumes and then identifying, from the solutions produced, the combinations of operating volumes and air-conditioning environments, the Pareto solutions that are in accordance with the various objectives for air-conditioning control, makes it possible to obtain solutions, as illustrated in FIG. 5, described above, that take into account the balance of the achievement levels for the objectives. Consequently, if one of these Pareto solutions is selected and the air-conditioning system is controlled by the operating volumes included in that Pareto solution, then it will be possible to produce easily and air-conditioning environment that takes into account balance among a plurality of objectives regarding air-conditioning control, such as the operating policies by the administrators and the desires of the users, and the like.

However, as described above, even if these Pareto solutions are Pareto solutions wherein the achievement levels of the respective objectives are similar, as described above, the operating volumes indicated by the respective Pareto solutions may be very different. Because of this, there is little relationship between the distribution location of the Pareto solution and the values of the operating volumes.

Moreover, if the operating volumes are very different, then, as described above, in some cases it will take time to transition from the original operating volumes to the new operating volumes, making it impossible to transition the air-conditioning environment smoothly and effectively. Moreover, such large differences in the operating volumes are also factors that contribute apprehension by the users of the air-conditioned space.

The aspect of the present invention is to enable a quantitative and comprehensive analysis of the differences in the operating volumes between such Pareto solutions through indicators based on knowledge regarding air-conditioning control.

Specifically, indicators of one or more types, established in advance, are each calculated based on a reference Pareto solution that was used to achieve the air-conditioning environment prior to a transition and based on a new Pareto solution used to achieve the air-conditioning environment after the transition, and the differences between the respective indicators are summed to calculate a similarity between the two Pareto solutions, where, based on these similarities, the Pareto solution with the lowest similarity to the reference Pareto solution where a Pareto solution that is near to the achievement levels for the objectives that are specified for the air-conditioning control is selected as the new Pareto solution.

A form for carrying out the present invention will be explained next in reference to the figures.

Structure of the Present Example

Figure 1:
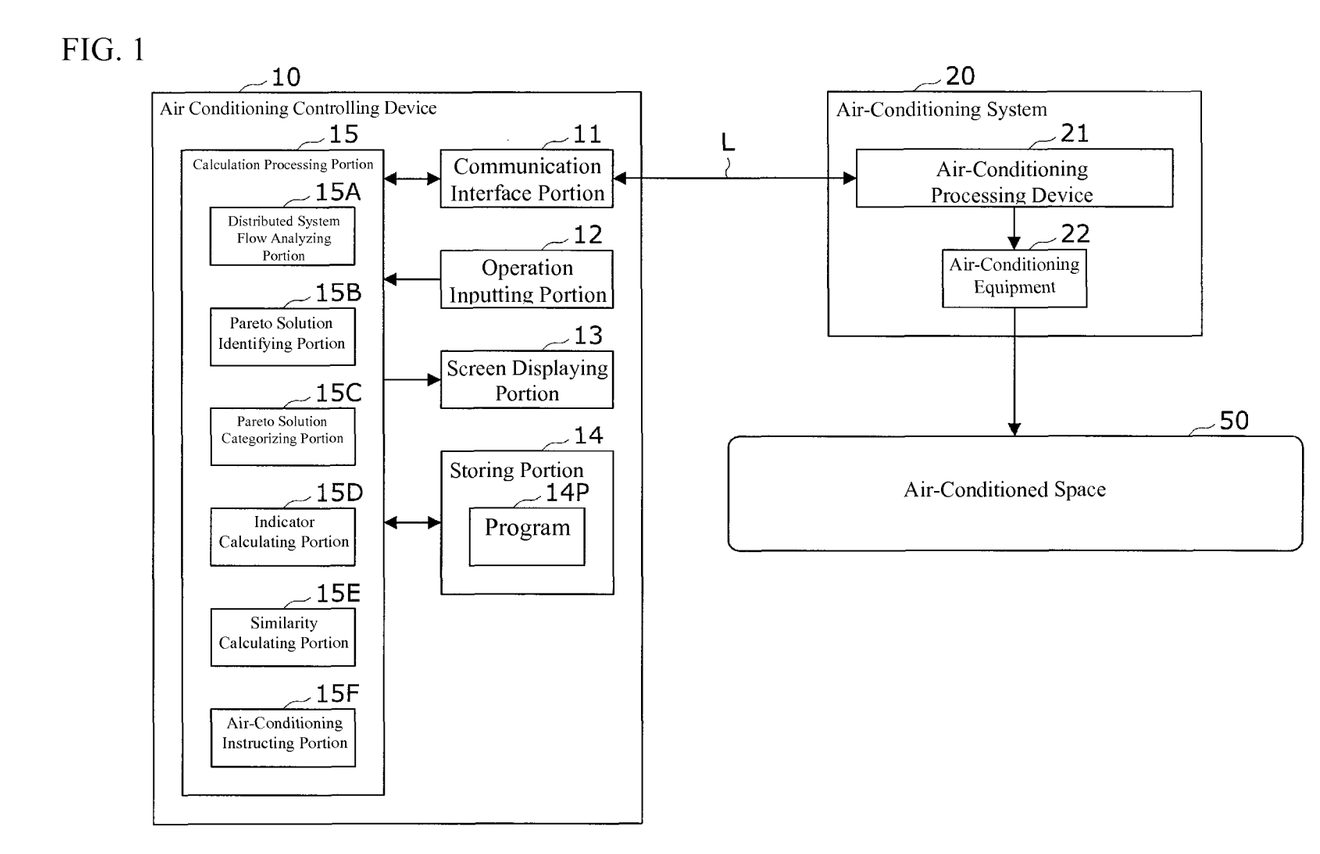
FIG. 1 is a block diagram illustrating a configuration of an air-conditioning controlling device.

An air-conditioning controlling device 10 according to the present example will be explained first in reference to FIG. 1. FIG. 1 is a block diagram illustrating a configuration of an air-conditioning controlling device.

The air-conditioning controlling device 10 comprises, overall, an information processing device such as a personal computer or a server, and has a function for controlling the air-conditioned space 50 to a desired air-conditioning environment through controlling an air-conditioning system 20.

As the primary structure thereof, the air-conditioning system 20 is provided with an air-conditioning processing device 21, and air-conditioning equipment 22.

The air-conditioning processing device 21 is structured, as a whole, from an information processing device such as a personal computer, a server device, or the like, and has a function for controlling entirety of the air-conditioning environment of the air-conditioned space 50, by controlling the air-conditioned air that is blown into the air-conditioned space 50 from the individual blowing vents by the air-conditioned device 22, based on operating quantities sent through communication lines L from the air-conditioning controlling device 10.

This air-conditioning controlling device 10 is provided with a communication I/F portion 11, an operation inputting portion 12, a screen displaying portion 13, a storing portion 14, and a calculation processing portion 15, as the primary functional components thereof.

The communication I/F portion 11 is made from a dedicated data communication circuit, and has the function of performing data communication with external devices, such as the air-conditioning system 20, connected through a communication line L.

The operation inputting portion 12 is made from an operation inputting device, such as a keyboard or a mouse, and has a function for detecting operations by an operator and outputting them to the calculation processing portion 15.

The screen displaying portion 13 is made from a screen displaying device such as an LCD or a PDP, and has a function for displaying, on a screen, various types of information, such as an operating menu and input/output data, in accordance with instructions from the calculation processing portion 15.

The storing portion 14 is made from a storage device, such as a hard disk or a semiconductor memory, and has a function for storing various types of processing data and a program 14P used by the calculation processing portion 15.

The program 14P is a program that is read out and executed by the calculation processing portion 15, and is stored in advance into the storing portion 14 through the communication I/F portion 11 from an external device or recording medium.

Figure 2:
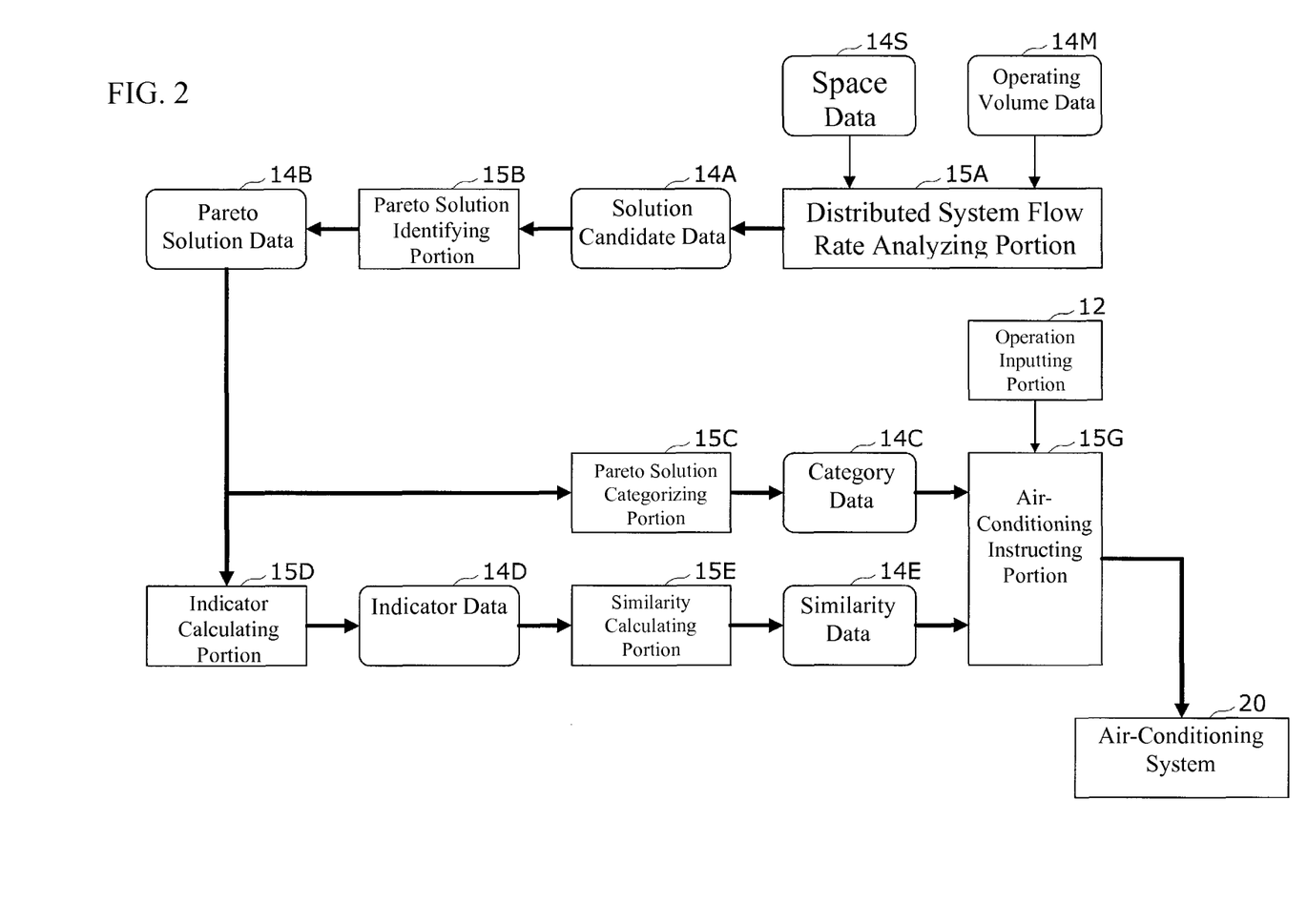
FIG. 2 is a flowchart illustrating the air-conditioning controlling procedure in the air-conditioning controlling device.

The calculation processing portion 15 has a microprocessor, such as a CPU and the peripheral circuitry thereof, and has the function of embodying a variety of processing portions through reading in and executed the program 14P from the storing portion 14. FIG. 2 is a flow chart illustrating the air-conditioning controlling process in the air-conditioning controlling device.

As the primary processing portions for embodying the calculation processing portion 15 there are a distributed system flow analyzing portion 15A, a Pareto solution identifying portion 15B, a Pareto solution categorizing portion 15C, an indicator calculating portion 15D, a similarity calculating portion 15E, and an air-conditioning instructing portion 15F.

The distributed system flow analyzing portion 15A has a function for selecting a different operating volume from a range of possible operating volumes for the air-conditioning equipment 22 based on operating volume data 14M, a function for estimating respective state distributions indicating the air-conditioning environments that can be produced by these operating volumes through distributed system flow analysis of selected operating volumes based on space data 14S, and a function for outputting, as solution candidate data 14A, combinations of these operating volumes and state distributions.

The distributed system flow analysis technique is a technique for calculating, through numerical calculations, the distributions of temperature, air flow rates, and the like, from boundary conditions based on CFD (computational fluid dynamics). In a typical CFD, the space of interest is divided into a mesh of element spaces, and the heat flow between adjacent element spaces is analyzed. The distributed system flow analyzing portion 15A has a function for performing a heat flow analysis process on the air-conditioned space 50 using this distributed system flow analysis technique, to estimate state distributions, such as temperature distributions and airflow distributions, of the air-conditioned space 50 from operating volume data 14M and space data 14S regarding the air-conditioned space 50. An actual CFD forward analysis procedure that is executed through a heat flow analysis procedure may use a known technology. See, for example, KATO, Shinsuke; KOBAYASHI, Hikaru; and, MURAKAMI, Shuzo: "Scales for Assessing Contribution of Heat Sources and Sinks to Temperature Distributions in Room by Means of Numerical Simulation," Institute of Industrial Science, University of Tokyo, Air-Conditioning and Sanitation Engineering Reports No. 69, pp. 39 to 47, April 1998.

The operating volume data 14M includes data indicating the state of control of the conditioned air in the air-conditioning system 20, such as the blowing airflow rates and blowing temperatures for the conditioned air that is blown from the individual blowing vents that are provided in the air-conditioned space 50, for example, and also the total flow rates and temperatures of the conditioned air in the air-conditioning equipment.

The space data 14S includes various types of data that form the setting conditions when performing the heat flow analysis processes, such as spatial condition data that represent locations and shapes pertaining to the structural elements that have an impact on the air-conditioning environment of the air-conditioned space 50, such as locations and shapes pertaining to the air-conditioned space 50, conditioned air blowing vents formed in the air-conditioning system 20, and the like, along with, for example, heat-producing object data that indicate the layout position, amount of heat produced, and shape of each heat-producing object that is disposed in the air-conditioned space 50.

The Pareto solution identifying portion 15D has a function for evaluating, for each solution candidate data 14A, which comprises a combination of operating volumes and state distributions, obtained from the distributed system flow analyzing portion 15A, the applicable solution candidates, based on a plurality of objective functions that are set in advance, a function for identifying Pareto solutions for these objective functions, from among these candidate solutions, based on the evaluation values for the individual candidate solutions, obtained with these objective functions, and a function for outputting Pareto solution data 14B, comprising a combination of the operating volumes and the state distributions for the identified Pareto solutions.

A Pareto solution is a solution wherein, in order to improve the value of one objective function it is necessary to adversely affect the value of one or more other objective functions, that is, it is a compromise solution. Specifically, a Pareto solution is a solution that provides a better evaluation than other solutions under specific conditions.

The objective functions may use known functions for evaluating air-conditioning control, such as the energy conservation and comfort, of the solutions based on the operating volumes for achieving the various types of air-conditioning environments and on state distributions representing the air-conditioning environments. For example, for the energy conservation, this may be calculated from an amount of heat that indicates the amount of energy required when transitioning to the air-conditioning environment produced by the Pareto solution, and for the comfort, this may use the comfort indicator PMV of the office workers within the air-conditioned space 50.

The Pareto solution categorizing portion 15C has a function for categorizing into each of a plurality of air-conditioning controlling modes, set in advance, the individual Pareto solutions within the Pareto solution data 14D, based on the evaluation values for the individual Pareto solutions obtained with the objective functions, and a function for outputting category data 14C that indicates the correspondence relationships between the Pareto solutions and the air-conditioning controlling modes.

The air-conditioning controlling modes are operating modes for the air-conditioning system 20, categorized and established in advance based on the achievement levels for the individual objectives, that is, based on the evaluation values, for the air-conditioning control of the air-conditioned space 50. For example, if the objectives for the air-conditioning control comprise energy savings and comfort, then if divided in five steps from emphasizing energy conservation to emphasizing comfort, five energy controlling modes may be set in terms of a Super Energy Conserving mode, an Energy Conserving mode, a Normal mode, a Comfort mode, and a Super Comfort mode. The user is able to control the air-conditioning system 20 easily through a selection operation for one of these air-conditioning controlling modes.

Figure 3:
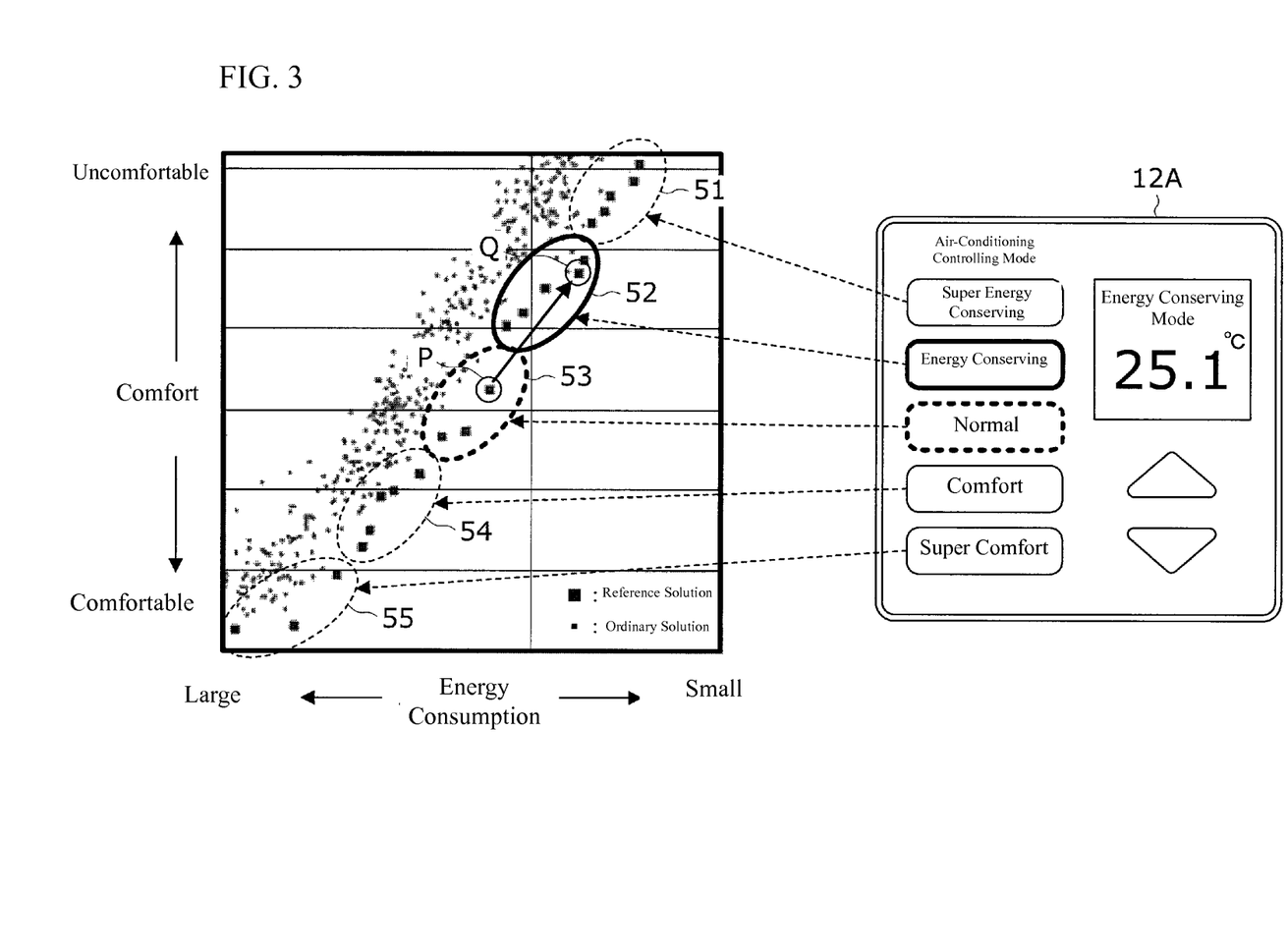
FIG. 3 is an explanatory diagram illustrating examples of categories of Pareto solutions.

FIG. 3 is an explanatory diagram illustrating examples of categories of Pareto solutions. Here to air-conditioning control items that have a trade-off relationship, namely energy conservation and comfort, are selected, so it can be seen that the individual Pareto solutions are solutions that take into consideration the balance between these indicators. In the figure, the small points are ordinary solutions that are not Pareto solutions.

The Pareto solutions are categorized into five groups 51 through 55 for each of the aforementioned five air-conditioning controlling modes, that is, the Super Energy Conserving mode, the Energy Conserving mode, the Normal mode, the Comfort mode, and the Super Comfort mode. These groups 51 through 55 correspond to mode selecting buttons 12B, specifically the "Super Energy Conserving Mode," "Energy Conserving Mode," "Normal Mode," "Comfort Mode," and "Super Comfort Mode," on a remote control panel 12A installed in the air-conditioned space 50, where the air-conditioning controlling mode can be changed through operating any of these mode selecting buttons 12B.

The indicator calculating portion 15D has a function for calculating one or more types of indicators for evaluating the similarity of the detail of the air-conditioning control based on the operating volumes and/or state distributions in relation to the Pareto solution for each Pareto solution within the Pareto solution data 14B, and a function for outputting indicator data 14D indicating the individual indicator values for the Pareto solutions.

As the indicators there are supply air temperature, total airflow, blowing air flow, and the like. For any of these indicators, there is a tendency for the difference in air-conditioning control to be larger, and for the similarity of the detail of the air-conditioning control to be smaller, the larger the change in the indicator. For these indicators, the indicator calculating portion 15D may select arbitrarily a plurality of indicator types depending on the objectives for air-conditioning control, the air-conditioning controlling mode prior to the transition or after the transition, or in response to an instruction operation.

The supply air temperature may use the temperature of the air-conditioned air that is supplied into the air-conditioned space 50, and total airflow may use a total airflow of the air-conditioned air that is supplied into the air-conditioned space 50. Moreover, the blowing airflow may use the airflows of the air-conditioned air at the individual blowing vents that are provided in the air-conditioned space 50.

The air that is drawn into the air-conditioning equipment, such as outside air, is blown, by a fan, to the blowing vents in the air-conditioned space 50 through ducts after the temperature thereof is adjusted through heat exchange in the air-conditioning equipment, and supplied into the air-conditioned space 50 by fans of VAVs (Variable Air Volume devices) equipped in the blowing vents.

At this time, the heat exchange in the air-conditioning equipment has some degree of a time constant, where the larger the scope of change in the supply air temperature, the longer the time required for the transition. The fans equipped in the air-conditioning equipment also have time constants, where the greater the scope of change in the RPMs thereof, the slower the change in the total airflow will be. Moreover, the fans that are equipped in the VAVs also have time constants, where the greater the scope of change in the RPMs thereof, the slower the change in the blowing airflows.

The similarity calculating portion 15E has a function for normalizing the indicator values of the individual Pareto solutions included in the indicator data 14D, a function for calculating the similarities of the Pareto solutions to a reference Pareto solution, for each Pareto solution, based on candidate indicators for that Pareto solution and on reference indicators for the reference Pareto solution that is selected as a reference from among the Pareto solutions, and a function for outputting similarity data 14E that indicates the degrees of similarity of the individual Pareto solutions.

For the normalization, the individual indicator values may be corrected, for each indicator type, so that the range from the minimum value to the maximum value for the indicator is from 0 to 1. At this time, if, between the indicator types, there are differences in significance to be considered at the time of calculating similarities, weightings may be applied based on weightings that are set in advance for the individual types of indicators.

The reference Pareto solution is the Pareto solution corresponding to the air-conditioning environment prior to the transition, and when performing a repeated selection of a Pareto solution, is the Pareto solution that was selected up until that point, where the other Pareto solutions are candidates indicating post-transition states.

The similarities may use to representative values obtained by calculating differences between the reference indicators and the candidate indicators, for each type of indicator, and then performing a statistical process on these differences between the reference indicators of the reference Pareto solution and the candidate indicators for a single Pareto solution that is a candidate. Here three similarity calculating methods will be explained as specific examples.

The first similarity calculating method is a method wherein an average value is calculated for the absolute values of the differences between the reference indicators and the candidate indicators. If the reference Pareto solutions are defined as Ys, the Pareto solutions that are candidates are defined as Yi, and the number of types of indicators is defined as N, then if the indicator value of indicator type n in Ys is defined as $Xs^n$ and the indicator value of indicator type n in Yi is defined as $Xi^n$, then the similarity Ri of Yi in relation to Ys is calculated through the following Equation (1).

[Expression 1]

$$Ri = \frac{1}{N} \sum_{n=1}^{N} |Xi^n - Xs^n| \quad (1)$$

The second similarity calculating method is a method wherein the maximum value of the absolute values of the differences between the reference indicators and the candidate indicators is calculated. If the function for selecting the maximum value from a plurality of elements is defined as max( ) then the similarity Ri of Yi in relation to Ys is calculated through the following Equation (2).

[Expression 2]

$$Ri = \max(|Xi^1 - Xs^1|, |Xi^2 - Xs^2|, \ldots, |Xi^N - Xs^N|) \quad (2)$$

A third similarity calculating method is a method wherein the root mean square of the differences between the reference indicators and the candidate indicators is calculated. The similarity Ri of Yi in relation to Ys is calculated through Equation (3), which follows.

[Expression 3]

$$Ri = \sqrt{\frac{1}{N} \sum_{n=1}^{N} (Xi^n - Xs^n)^2} \quad (3)$$

The air-conditioning instructing portion 15F has a function for selecting the Pareto solution having the smallest similarity, in relation to the reference Pareto solution, of the Pareto solutions belonging to the new air-conditioning controlling mode, based on the category data 14C and the similarity data 14E, when changing the air-conditioning mode that is applied to the air-conditioned space 50 to a new air-conditioning controlling mode, and a function for sending, to the air-conditioning system 20, the operating volumes associated with the selected Pareto solution.

Operation of the Present Example

Figure 4:
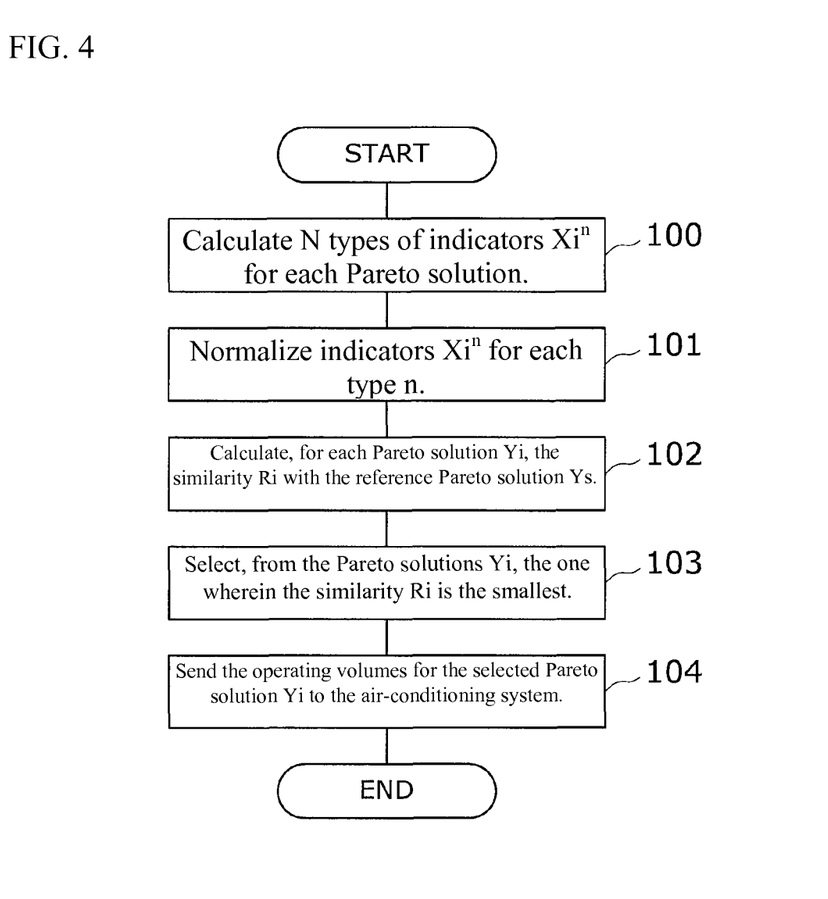
FIG. 4 is a flowchart illustrating an air-conditioning controlling procedure.

The operation of the air-conditioning controlling device 10 according to the present example will be explained next in reference to FIG. 2 and FIG. 4. FIG. 4 is a flowchart showing the air-conditioning controlling procedure.

The calculation processing portion 15 of the air-conditioning controlling device 10 begins the air-conditioning controlling process of FIG. 4 at the time of startup or in response to an operator operation. Note that the Pareto solution data 14B and the category data 14C are already stored in the storing portion 14 prior to the start of execution of the air-conditioning controlling procedure.

First, for each Pareto solution Yi that is included in the Pareto solution data 14B that is read out from the storing portion 14, the indicator calculating portion 15D calculates, and outputs as indicator data 14D, N types of indicators $Xi^n$, based on the operating volumes and/or state distributions, for that Pareto solution (Step 100).

Following this, the similarity calculating portion 15E normalizes the indicators $Xi^n$ for each Pareto solution Yi included in the indicator data 14D that has been outputted from the indicator calculating portion 15D (Step 101), and then, for each Pareto solution Yi, calculates the similarity Ri of the applicable Pareto solution Yi in relation to the reference Pareto solution Ys, and stores the results in the storing portion 14 as similarity data 14E (Step 102).

Thereafter, when changing, to a new air-conditioning controlling mode, the air-conditioning controlling mode that is applied to the air-conditioned space 50, in response to an instruction from the operation inputting portion 12, the air-conditioning instructing portion 15 selects, from the Pareto solutions Yi that belong to the new air-conditioning controlling mode, the Pareto solution Yi having smallest similarity in relation to the reference Pareto solution Ys, based on the category data 14C and the similarity data 14E read out from the storing portion 14 (Step 103), and sends, to the air-conditioning system 20, the operating volumes for the selected Pareto solution Yi (Step 104), to complete the series of air-conditioning controlling procedures.

Consequently, in, for example, the aforementioned FIG. 3, in a state wherein, prior to the transition of the air-conditioning environment, "Normal" was selected as the air-conditioning controlling mode and a Pareto solution P was selected from the group 53 corresponding thereto, then if "Energy Conserving" is selected at the new air-conditioning controlling mode, then the Pareto solution Q that is most similar to the detail of the air-conditioning control is selected from the group 52, corresponding thereto, regardless of the position of distribution relative to the Pareto solution P.

Effects of the Present Example

In this way in the present example, for each Pareto solution the indicator calculating portion 15D calculates indicators of one or more types for evaluating the similarity of the details of the air-conditioning control based on the operating volumes and/or state distributions for the applicable Pareto solution, the similarity calculating portion 15E calculates, for each Pareto solution, the similarity of the Pareto solution to a reference Pareto solution, based on the indicators for the Pareto solution and the indicators for a reference Pareto solution that is selected as a reference from among the Pareto solutions, and the air-conditioning instructing portion 15F, when there is a change, to a new air-conditioning controlling mode, of the air-conditioning controlling mode that is applied to the air-conditioned space 50, sends, to the air-conditioning system 20, operating volumes for the Pareto solution having the smallest similarity, in relation to the reference Pareto solution, from among the Pareto solutions belonging to the new air-conditioning controlling mode.

Given this, when there is a repeat selection of a Pareto solution, the Pareto solution, among the Pareto solutions that are near to the new achievement levels for the objectives, that is most similar to the detail of the air-conditioning control of the original reference Pareto solution is selected as the new Pareto solution.

Consequently, controlling the air-conditioning environment based on such a new Pareto solution not only makes it possible to achieve air-conditioning control in accordance with the objectives of the administrator and users of the air-conditioned space when it comes to the air-conditioning control, but also possible transition the air-conditioning environment efficiently and smoothly without causing the user of the air-conditioned space discomfort or apprehension.

EXPANDED EXAMPLES

While the present invention was explained above in reference to examples, the present invention is not limited by the examples set forth above. The structures and details of the present invention may be modified in a variety of ways, as can be understood by those skilled in the art, within the scope of the present invention.

The invention claimed is:

1. An air-conditioning controlling device for controlling, to an arbitrary air-conditioning environment, an air-conditioned space through sending, to an air-conditioning system that controls air-conditioning equipment, operating volumes for the air-conditioning equipment, the device comprising:
   a distributed system flow analyzing portion that estimates, through a processor performing distributed system flow analysis for a plurality of different operating volumes, respective state distributions that describe the air-conditioning environment produced by the operating volumes;
   a Pareto solution identifying portion that identifies from solution candidates including combinations of operating volumes and state distributions, respective Pareto solutions in relation to objective functions through, for each solution candidate, evaluating the solution candidate, via the processor, based on a plurality of objective functions that have been set in advance;
   a Pareto solution categorizing portion that respectively categorizes the individual Pareto solutions, via the processor, into a plurality of air-conditioning controlling modes, set in advance, based on the evaluation values of the individual Pareto solutions, calculated by the objective functions;
   an indicator calculating portion that calculates, via the processor, one or more indicators for evaluating, for each individual Pareto solution, similarity of the detail of air-conditioning control based on the operating volumes and/or the state distributions for the Pareto solution;
   a similarity calculating portion that calculates, via the processor, for each Pareto solution, similarity of the Pareto solution to a reference Pareto solution, based on the indicators for the Pareto solution and the indicators for the reference Pareto solution, which is selected as a reference from the Pareto solutions; and
   an air-conditioning controlling portion that controls the air-conditioning system, via the processor, to implement the operating volumes of the Pareto solution with the least similarity to the reference Pareto solution from among the Pareto solutions belonging to the new air-conditioning controlling mode when there is a change, to a new air-conditioning controlling mode, of the air-conditioning controlling mode that is applied to the air-conditioned space.

2. The air-conditioning controlling device as set forth in claim 1, wherein the indicator calculating portion, when calculating the indicators for the Pareto solution, selects, as an indicator, one or more values from among the supply air temperature of the air-conditioned air that is supplied to the air-conditioned space, the total airflow of the air-conditioned air, and/or the blowing airflows of the blowing vents of the air-conditioned space, included in the operating volumes for the Pareto solution.

3. The air-conditioning controlling device as set forth in claim 1, wherein when calculating the similarity of a Pareto solution, the similarity calculating portion calculates, for each type of indicator, the difference between the candidate indicator and the reference indicator, and calculates, as the similarity, an average value for the absolute values of the differences, a maximum value for the absolute values of the differences, or a root mean square of the differences.

4. An air-conditioning controlling method using an air-conditioning controlling device for controlling, to an arbitrary air-conditioning environment, an air-conditioned space through sending, to an air-conditioning system that controls air-conditioning equipment, operating volumes for the air-conditioning equipment, the method comprising:
- a distributed system flow analyzing step of estimating by a distributed system flow analyzing portion, through a processor performing distributed system flow analysis for a plurality of different operating volumes, respective state distributions that describe the air-conditioning environment produced by the operating volumes;
- a Pareto solution identifying step of identifying by a Pareto solution identifying portion using the processor, from solution candidates including combinations of operating volumes and state distributions, respective Pareto solutions in relation to the objective functions through, for each solution candidate, evaluating the solution candidate based on a plurality of objective functions that have been set in advance;
- a Pareto solution categorizing step of respectively categorizing by a Pareto solution categorizing portion using the processor, the individual Pareto solutions into a plurality of air-conditioning controlling modes, set in advance, based on the evaluation values of the individual Pareto solutions, calculated by the objective functions;
- an indicator calculating step of calculating by an indicator calculating portion using the processor, one or more indicators for evaluating, for each individual Pareto solution, similarity of the detail of air-conditioning control based on the operating volumes and/or the state distributions for the Pareto solution;
- a similarity calculating step of calculating by a similarity calculating portion using the processor, for each Pareto solution, similarity of the Pareto solution to a reference Pareto solution, based on the indicators for the Pareto solution and the indicators for the reference Pareto solution, which is selected as a reference from the Pareto solutions; and
- an air-conditioning controlling step of controlling the air-conditioning system, via the processor, to implement the operating volumes of the Pareto solution with the least similarity to the reference Pareto solution from among the Pareto solutions belonging to the new air-conditioning controlling mode when there is a change, to a new air-conditioning controlling mode, of the air-conditioning controlling mode that is applied to the air-conditioned space.

5. A computer-controlled air-conditioning system comprising:
- a processor;
- an air-conditioning system operatively connected to the processor;
- memory, operatively connected to the processor, where the memory comprises instructions which, when executed by the processor, cause the processor to perform a method comprising:
  - estimating, by performing distributed system flow analysis for a plurality of different operating volumes, a plurality of respective state distributions that describe the air-conditioning environment produced by the plurality of different operating volumes;
  - identifying individual Pareto solutions, from a plurality of solution candidates which include combinations of operating volumes and state distributions, by evaluating the plurality of solution candidates based on a plurality of objective functions that have been set in advance;
  - categorizing the individual Pareto solutions into a plurality of pre-established air-conditioning controlling modes, based on evaluation values of the individual Pareto solutions calculated by the objective functions;
  - calculating, for each individual Pareto solution, one or more indicators for evaluating similarity of a detail of air-conditioning control, based on at least one of the operating volumes and the state distributions for the individual Pareto solution;
  - calculating, for each individual Pareto solution, similarity of the individual Pareto solution to a reference Pareto solution, where the calculated similarity is based on the indicators for the Pareto solution and the indicators for the reference Pareto solution, and where the reference Pareto solution is selected from the individual Pareto solutions; and
  - when a current air-conditioning controlling mode is changed to a new air-conditioning controlling mode, controlling the air-conditioning system to implement the operating volumes of the individual Pareto solution belonging to the new air-conditioning controlling mode and having the least similarity to the reference Pareto solution.

* * * * *